(12) United States Patent
Schilit et al.

(10) Patent No.: US 6,687,876 B1
(45) Date of Patent: Feb. 3, 2004

(54) METHOD AND SYSTEM FOR MAINTAINING FREEFORM INK ANNOTATIONS ON CHANGING VIEWS

(75) Inventors: William N Schilit, Menlo Park, CA (US); Morgan N Price, Palo Alto, CA (US); Gene Golovchinsky, Palo Alto, CA (US)

(73) Assignees: Fuji Xerox Co., Ltd., Tokyo (JP); Xerox Corporation, Stamford, CT (US)

( * ) Notice: Subject to any disclaimer, the term of this patent is extended or adjusted under 35 U.S.C. 154(b) by 0 days.

(21) Appl. No.: 09/222,962

(22) Filed: Dec. 30, 1998

(51) Int. Cl.[7] .................................................. G06F 7/00

(52) U.S. Cl. ...................... 715/512; 715/501.1; 715/513

(58) Field of Search ................................ 707/500, 502, 707/512, 513, 501.1; 715/500, 502, 512, 513, 501.1

(56) References Cited

U.S. PATENT DOCUMENTS

| | | | | |
|---|---|---|---|---|
| 5,559,942 A | | 9/1996 | Gough et al. ............. | 345/802 |
| 5,590,257 A | * | 12/1996 | Forcier ..................... | 715/530 |
| 5,621,871 A | | 4/1997 | Jaremko et al. ........... | 345/441 |
| 5,815,830 A | * | 9/1998 | Anthony ................... | 707/1 |
| 5,832,474 A | * | 11/1998 | Lopresti et al. .......... | 382/309 |
| 5,893,126 A | * | 4/1999 | Drews et al. ............. | 345/781 |
| 6,178,434 B1 | * | 1/2001 | Saitoh ...................... | 707/500 |
| 6,356,922 B1 | * | 3/2002 | Schilit et al. ............. | 707/3 |

FOREIGN PATENT DOCUMENTS

EP      0 902 384 A2    3/1999

OTHER PUBLICATIONS

Li et al, "Data Object and Label Placement For Information Abundant Visualizations", ACM Proceedings of the 1998 workshop on New Paradigms in information visualization and manipulation, Nov. 1998.*

Lamping et al, "Visualizing Large Trees Using the Hyperbolic Browser", ACM Conference companion on Human factors in computing systems: common ground, Apr. 1996.*

Zellweger et al, "Fluid Links for Informed and Incremental Link Transitions", ACM Hypertext 98', May 1998.*

Durand et al, "MAPA: a system for inducing and visualizing hierarchy in websites", May 1998.*

Microsoft Paint ink stroke annotation screendumps, Microsoft, 1998.*

Linking Handwriting Annotation with Text, IBM TDB, vol. 32, Iss.6A, pp. 452–454, Nov. 1, 1989.*

Lamping et al., "A Focus + Context Technique Based on Hyperbolic Geometry for Visualizing Large Hierarchies", Proceedings of ACM SIGCHI Conference on Human Factors and Computing Systems, May 1995, p. 1–13.

(List continued on next page.)

Primary Examiner—Stephen S. Hong
Assistant Examiner—Cesar B. Paula
(74) Attorney, Agent, or Firm—Oliff & Berridge, PLC

(57) ABSTRACT

The method and system of the invention maintains the indication of the logical relationship of freeform digital ink annotations to objects in an electronic display even as the view changes. The invention maps the logical relationship of the freeform digital ink annotations to objects in the view based upon the layout relationships of the freeform digital ink annotations to the objects in the view. If the view changes, the invention maintains the layout relationship of the freeform digital ink annotations to the objects in the view based upon the mapping of the freeform digital ink annotations to the objects.

42 Claims, 14 Drawing Sheets

OTHER PUBLICATIONS

Moran et al., "Pen–Based Interaction Techniques for Organizing Material on an Electronic Whiteboard", UIST '97, ACM press, pp. 45–54.

Harmon et al., "Virtual Annotation System", Proceedings of the IEEE 1996 Virtual Reality Annual International Symposium, pp. 239–245 (1996).

Elvins et al., "Worldlets–3D Thumbnails for Wayfinding in Virtual Environments", in video proceedings of UIST '97, pp. 21–30 (1997).

Hardock et al., "A Marking Based Interface for Collaborative Writing", Proceedings of UIST '93 (1993) p. 259–266.

Francik, "Rapid, Integrated Design of a Multimedia Communication System", Human–Computer Interface Design, Morgan Kaufman Publishers, Inc. Pp 36–69 (1996).

Weber et al., "Marquee: A Tool for Real–Time Video Logging", Proceedings of CHI '94, ACM Press (Apr. 1994) p. 58–64.

Schilit et al., "Dynomite: A Dynamically Organized Ink and Audio Notebook", Proceedings of CHI '97, ACM Press, (1997).

* cited by examiner

2 The Problems

In this section we present a (number) of problems that stand in the way of our vision. Each problem is described with a few concrete examples, and then avenues of investigation that may lead to a solution are presented in subsections.

2.1 Providing information access on mobile devices is hard

Specific examples of this problem are:

- Not being able to get the information you need when you're away from your desktop.
- Waiting for Web pages to download over a slow modem or wireless link.

One promise of portable computers is information access anytime, anywhere. People have become reliant on continuous, high-speed, low-cost networks at their desktop, yet portable computers are rarely connected to such networks. Caching is a technique that makes portable computers less dependent on ubiquitous low-cost networking.

Caching is an ancient computer science technique that stores a copy of frequently referenced information near at hand. Although it is a simple concept, a number of subtle problems arise in practice.

Caching has additional implications for mobile devices. When connecting over wireless networks, cache misses not only take a relatively long time to process, but also may result in expensive fees for network access. Moreover, when operating disconnected from a network, cache misses may stop users from continuing with their work.

2.1.1 Removing documents from local storage

Researchers have been investigating new replacement policies that better predict future references. One avenue is to augment computational predictions with direct user interactions, on the assumption that people often know which information is most important to keep in hand. The TeleWeb [Schili96] and Mowgli [Liljeberg95] mobile web browsers allow users to lock documents into the cache. One severe problem with a user-level locking interface is that over time more and more documents become locked because users tend to lock more then they purge. In this case, caching becomes much less effective because locked, but no longer relevant, documents can take up a large part of a cache.

Another approach is to ask the user which documents to discard instead of which documents to keep [Goldberg93]. For example, when cache replacement is necessary the system might use a

FIG.6

METHOD AND SYSTEM FOR MAINTAINING FREEFORM INK ANNOTATIONS ON CHANGING VIEWS

BACKGROUND OF THE INVENTION

1. Field of Invention

This application is directed to an electronic system for displaying changing views. In particular, the invention is directed to permitting freeform digital ink annotation on electronic media and to maintaining the logical relationship between freeform digital ink annotations and objects in changing views of the media.

2. Description of Related Art

Freeform ink annotation of paper documents is a widespread practice because it aids many aspects of document work, including the processes of thinking, categorizing and reviewing. In short, freeform ink annotation has proven to be a powerful comprehension tool. Paper and paper-like documents (such as PDF, postscript, image files, etc.) have a static layout and content. The static nature of these documents makes annotation simple.

However, the kinds of documents that people use are increasingly created and presented digitally on displays using computers. Such documents are often dynamic and, therefore, the accurate representation of the relationship of the annotations to objects in the display has been impossible because of the changing display. For example, a display of a word processor document changes as the document is undergoing revisions. In a similar manner, information visualization systems such as the hyperbolic browser disclosed in *A Focus+Context Technique Based on Hyperbolic Geometry for Visualizing Large Hierarchies*, by Lamping et al., in Proceedings of ACM SIGCHI Conference on Human Factors and Computing Systems, May 1995, change the display of the document as the user navigates the information space.

A freeform digital ink whiteboard known as Tivoli is disclosed in *Pen-Based Interaction Techniques For Organizing Material on an Electronic Whiteboard*, by Moran, et al., in UIST '97, ACM press. Tivoli allows users to identify a connection between two areas in a display, where that connection is maintained as those areas are moved and the display changes. Circle marks which surround other ink identify areas, and freeform digital ink marks which connect two area boundaries together form a connection between those two areas. This connection persists as the areas move and Tivoli attempts to maintain the shape of the connecting mark.

To assist in navigation of documents conventional systems use a set type of bookmark. Examples of such navigation systems are disclosed in *Virtual Annotation System*, by Harmon, et al., in Proceedings of the IEEE 1996 Virtual Reality Annual International Symposium, pp. 239–245 (1996) and in *Worldlets: 3D Thumbnails for Wavfinding in Virtual Environments*, by Elvins, et al., in video proceedings of UIST '97, pp. 21–30 (1997). These systems make it ackward for a user to freely interact with the navigation system because the user is required to specify an annotation command before commenting.

Current systems attempt to manage freeform digital ink annotation on changing views or displays by at least one of three methods (the terms "view" and "display" are used interchangeably throughout this application). The first method, known as the static approach, treats ink annotations as associated with a single view. When the presentation or the content of the document changes, the annotations either disappear or remain in their original positions. A system known as "MATE" which is disclosed in *A Marking Based Interface for Collaborative Writing*, by Hardock et al., in Proceedings of UIST '93 (1993), addresses changing content by maintaining a static annotated version, a changed version without annotation and logical links between these two versions.

A second method, known as the snapshot approach, treats the dynamic view as a series of static snapshots which can be individually annotated. Examples of this approach include the Wang Freestyle disclosed in *Rapid, Integrated Desin of a Multimedia Communication System*, by Francik, in Human-Computer Interface Design, Morgan Kaufman Publishers, Inc., (1996).

The third method, known as the temporal association approach, separates the ink annotations from the view and links the two temporally, so that marks made in a specific time are associated with the view at that time. Examples of this approach are used in Marquee which is disclosed in *Marquee: A Tool for Real-Time Video Logging*, by Weber et al., in Proceedings of CHI '94, ACM Press, (April 1994) and Dynomite which is disclosed in *Dynomite: A Dynamically Organized Ink and Audio Notebook*, by Schilit et al., In Proceedings of CHI '97, ACM Press, (1997).

SUMMARY OF THE INVENTION

In conventional interfaces that accept freeform digital ink annotation, the indication of the logical relationships between the annotations and the associated objects are not maintained if the view changes. For example, if a user annotates the text of a document and, subsequently, the annotated text reflows across lines, the annotation does not follow the reflowed portion of the text. Therefore, while there may be an underlying logical relationship to the annotated text, the layout of the new view does not indicate this logical relationship between the text and the annotation.

The systems described as related art above also do not maintain any indication of logical relationships between the annotations and the associated objects if the view changes. Tivoli does not maintain the freeform digital ink annotations as the areas move around and the display changes. Rather, Tivoli maintains only one specific type of annotation: a single stroke from the boundary of one area to another. This restriction precludes the use of freeform digital ink annotations in changing displays to label moving objects or to aid navigation.

While MATE maintains the logical relationships between freeform digital ink annotations and the corresponding underlying text, it does not maintain the indications of these logical relationships as the view changes.

Freestyle does not allow the freeform digital ink annotations to carry over to new views of the same document Dynomite does not permit annotations directly on the view and the annotations are not rendered on the new views in accordance with changes to the views.

The method and system of the invention maintain the layout relationships between freeform digital ink annotations and objects in changing views. As a user makes a freeform digital ink annotation on a view and as the view changes, the method and system of the invention adapt the marks in accordance with the changes. Thus, the logical relationship between the freeform digital ink annotations and the objects made in one view can be understood in future views based upon the layout relationships.

The method and system also maintain the indication of the logical relationships between freeform digital ink annotations and objects in dynamic media such as video and interactive virtual worlds. For example, if a user, who is exploring an information space with a hyperbolic browser, makes a freeform digital ink annotation on a node of the tree, when the user changes the display to bring another portion of the tree into focus, the freeform digital ink annotation rotates and scales along with the tree to continue to indicate the logical relationship of the freeform digital ink annotation to the node.

The methods and systems of this invention maintain the indication of the logical relationships between freeform digital ink annotations and objects in a view as the view of the annotated objects changes. This invention brings the experience of marking on paper to dynamic media, changing word-processor documents, information visualizations, virtual worlds, digital video and word processors.

The system and method of the present invention maintain the indication of the logical relationship, even if the objects that are logically related to the freeform digital ink annotations are deleted, inserted, copied or moved or otherwise altered. The method and system also maintain the indication of the logical relationship if the layout presentation of the objects in the display change because the objects reflow, scale, resize, rotate, stretch, distort or morph or if any other aspect of the layout presentation changes, regardless of whether these changes occur discretely or continuously.

Additionally, another exemplary embodiment of the systems and methods of the invention provides navigational markers that make freeform digital ink annotation a powerful tool for navigating dynamic documents. A user is permitted to select a freeform digital ink annotation in an arbitrary view, and the display is returned to the state it was in when the selected freeform digital ink annotation was made.

BRIEF DESCRIPTION OF THE DRAWINGS

The preferred embodiments of this invention will be described in detail, with reference to the following figures, wherein:

FIG. 6 shows a few examples of different types of freeform digital ink annotations.

These and other features and advantages of this invention are described in or are apparent from the following detailed description of the preferred embodiments.

DETAILED DESCRIPTION OF PREFERRED EMBODIMENTS

Figure 1:
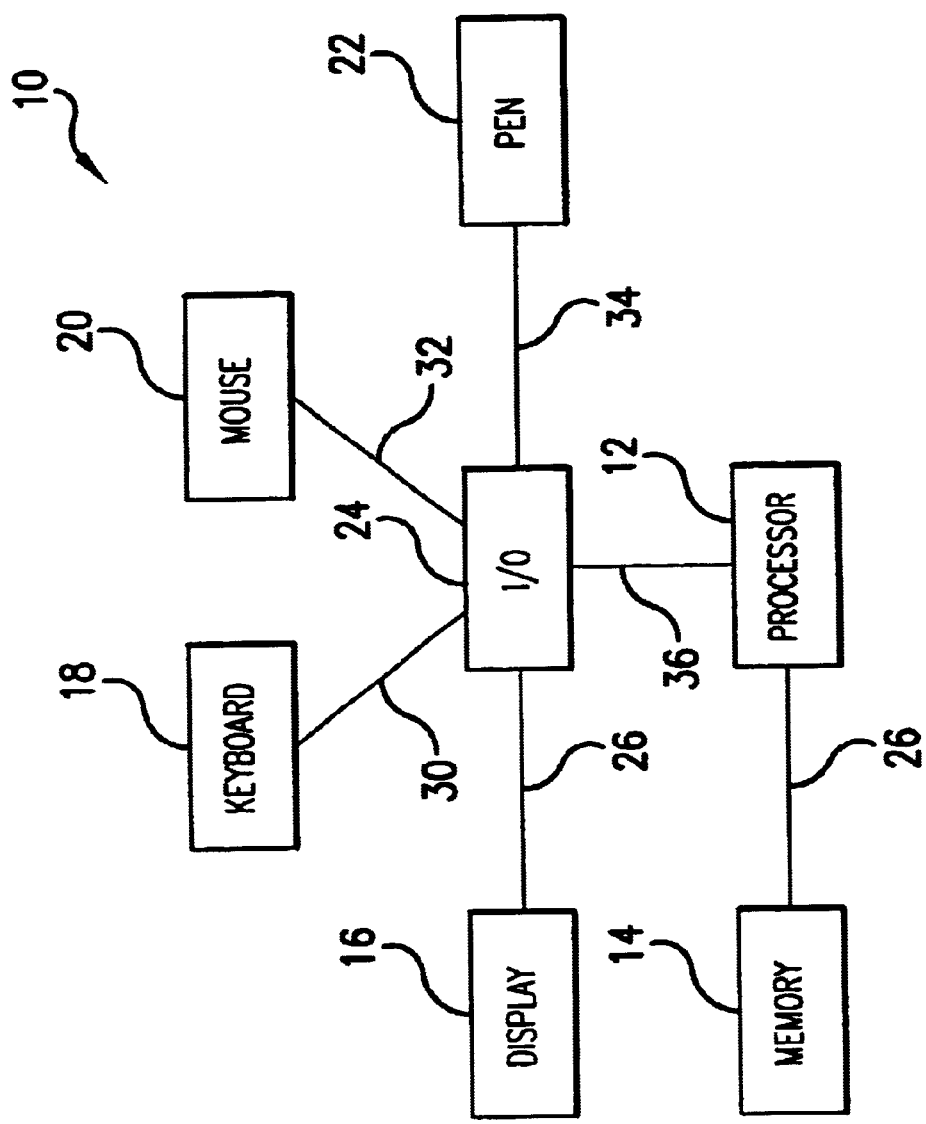
FIG. 1 is a block diagram of an embodiment of the system for displaying changing views of this invention.

FIG. 1 shows one exemplary embodiment of the electronic system 10 of this invention. The electronic system 10 includes a processor 12 communicating with a memory 14 that stores the programs, documents and other data for practicing the invention. The processor 12 also communicates with a display 16, a keyboard 18, a mouse 20 and a pen 22 via input/output device 24. The keyboard 18, mouse 20, pen 22 and any other interface devices (not shown) are operated by a user to control the operation of the electronic system 10. Control of the electronic system 10 is not limited to the interface devices shown and does not require any particular interface device. The display 16 may be on a stand-alone pen computer or a tablet connected by a tether to a conventional computer or any other type of display.

As shown in FIG. 1, the system 10 is preferably implemented using a programmed general purpose computer. However, the system 10 can also be implemented using a special purpose computer, a programmed microprocessor or microcontroller and any necessary peripheral integrated circuit elements, an ASIC or other integrated circuit, a hardwired electronic or logic circuit such as a discrete element circuit, a programmable logic device such as a PLD, PLA, FPGA or PAL, or the like. In general, any device on which a finite state machine capable of implementing the flow charts shown in FIGS. 4A–5B can be used to implement the system 10.

Additionally, as shown in FIG. 1, the memory 14 is preferably implemented using static or dynamic RAM. However, the memory 14 can also be implemented using a floppy disk and disk drive, a writable optical disk and disk drive, a hard drive, a flash memory or the like. Additionally, it should be appreciated that the memory 14 can be either distinct portions of a single memory or physically distinct memories.

Further, it should be appreciated that the links 26, 28, 30, 32, 34 and 36 connecting the memory 14, the display 16, the keyboard 18, the mouse 20, the pen 22 and the input/output device 24 to the processor 12 can be wired or wireless links to networks (not shown). These networks can be local area networks, wide area networks, intranets, the Internet, or any other distributed processing and storage networks.

Figure 2A:
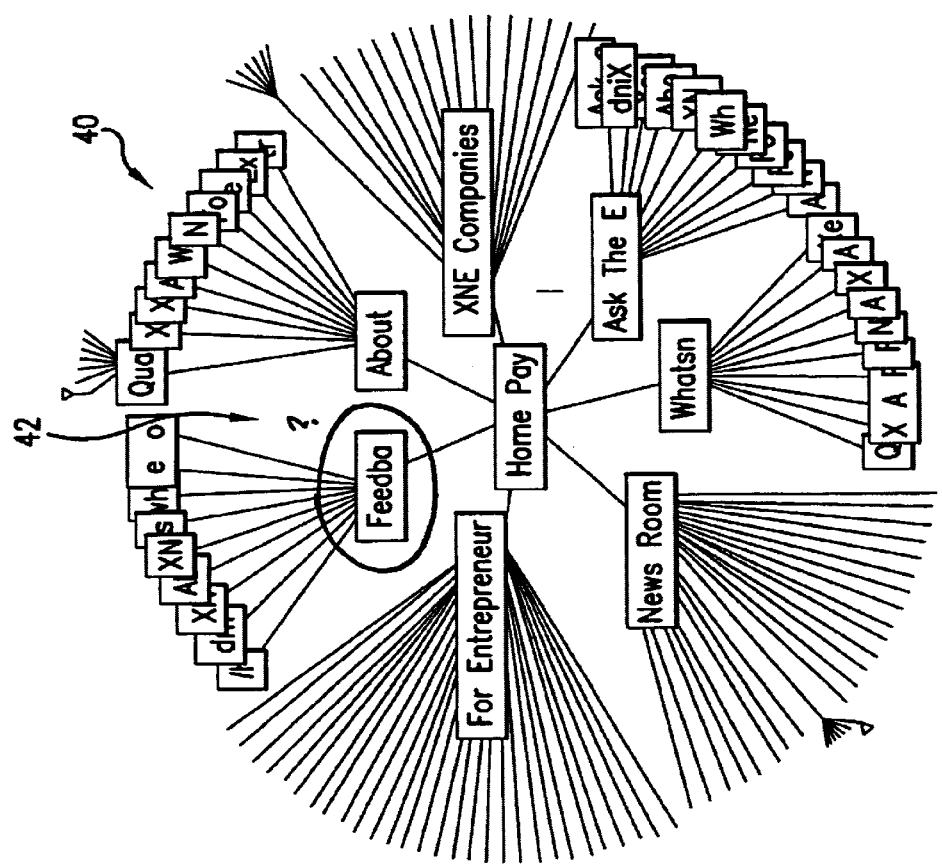
FIG. 2A shows a display of an annotated hyperbolic browser in accordance with an embodiment of the present invention.
Figure 2B:
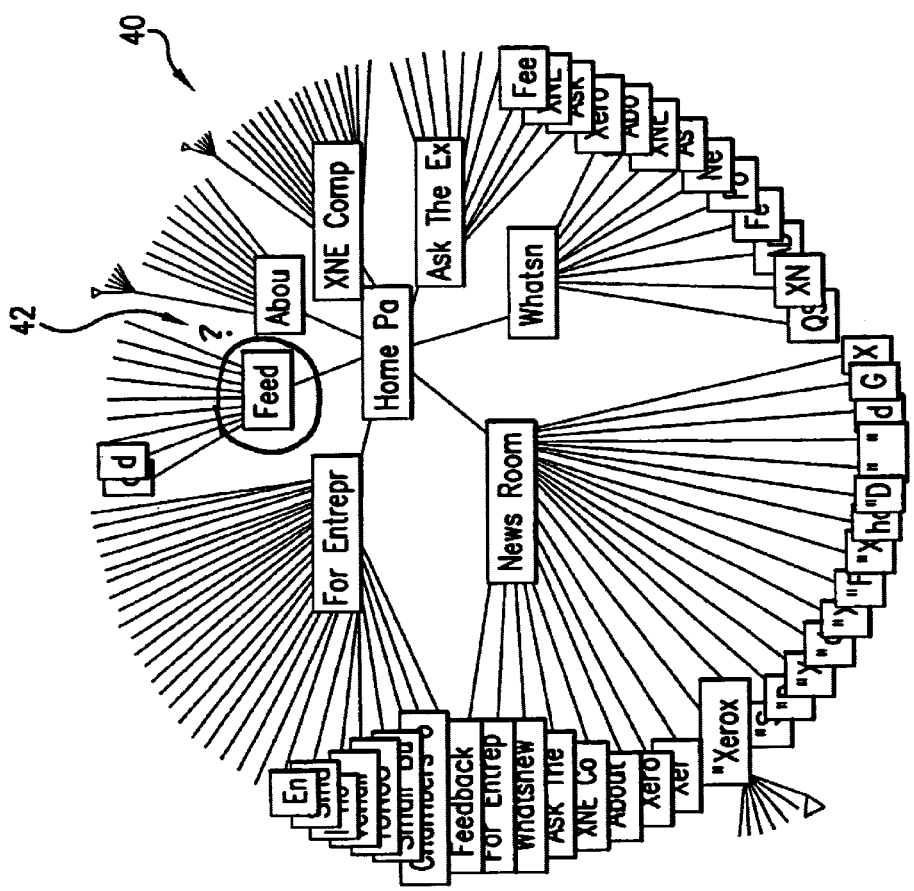
FIG. 2B shows the annotated hyperbolic browser of FIG. 2A with the view changed and freeform digital ink annotations adjusted in accordance with the change in the view in accordance with an embodiment of the invention.

FIG. 2A shows a display of a view of a hyperbolic browser 40. The display 40 includes a freeform digital ink annotation 42. FIG. 2B shows an alternative view of the document shown in FIG. 2A. The freeform digital ink annotation 42 has been scaled and moved so that the layout presentation of the freeform digital ink annotation in the view corresponds with the change of the view of the objects in the document 40 to maintain the indication of the logical relationship between the freeform digital ink annotation 42 and the objects.

Figure 3A:
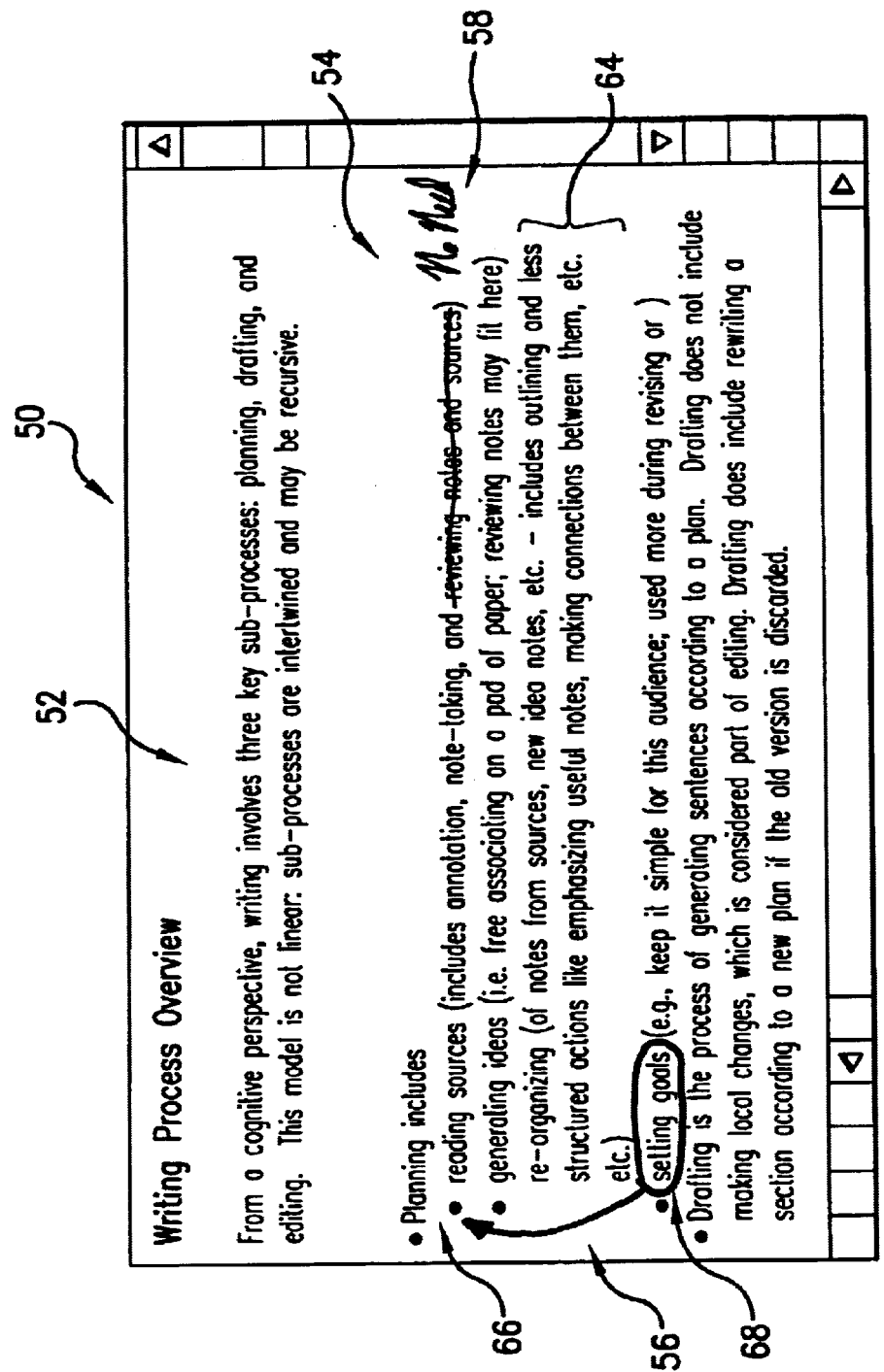
FIG. 3A shows a display of an annotated document.
Figure 3B:
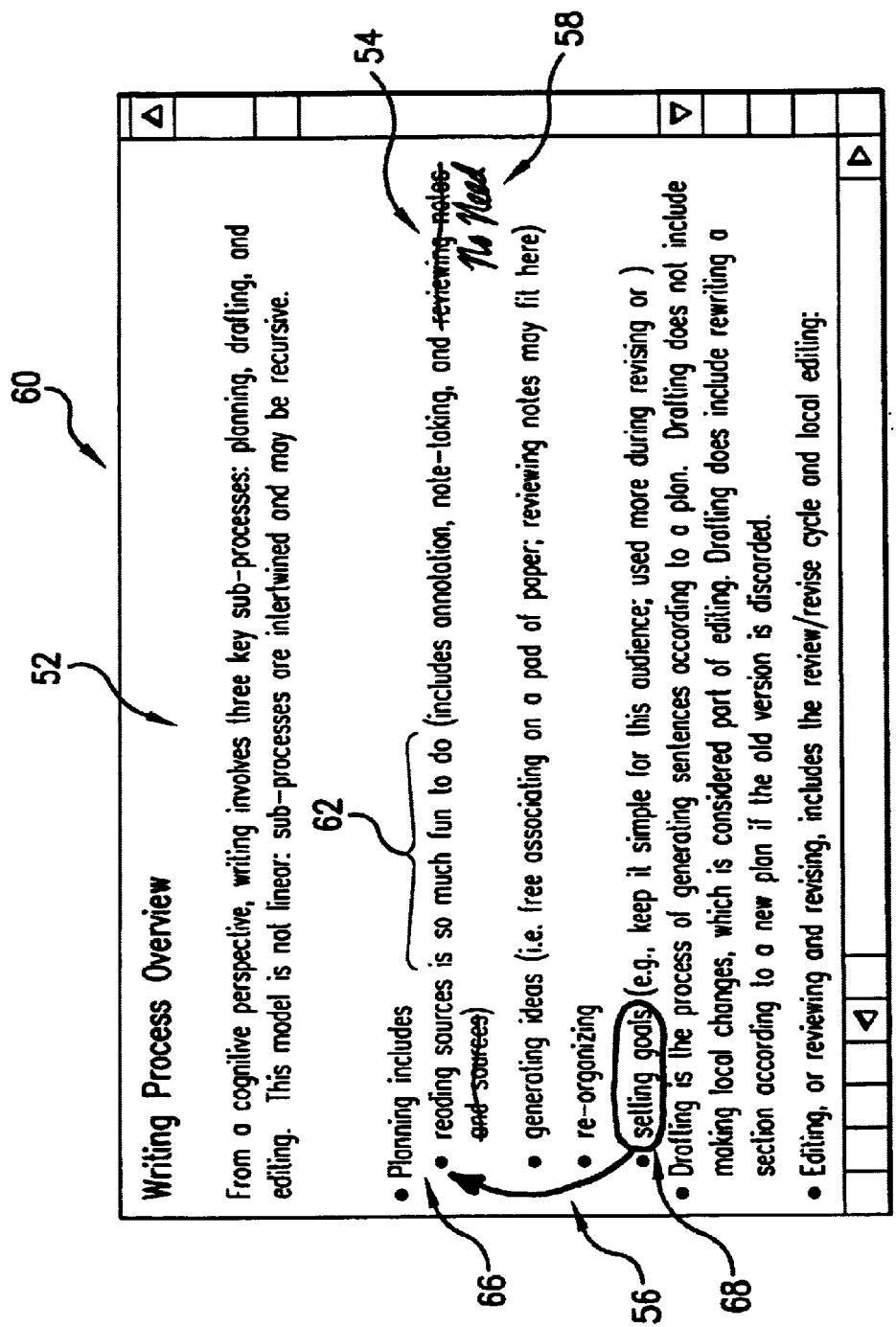
FIG. 3B shows the annotated document of FIG. 3A after modification of the document and shows the adjustments to the freeform digital ink annotations in accordance with an embodiment of the present invention.
Figure 4A:
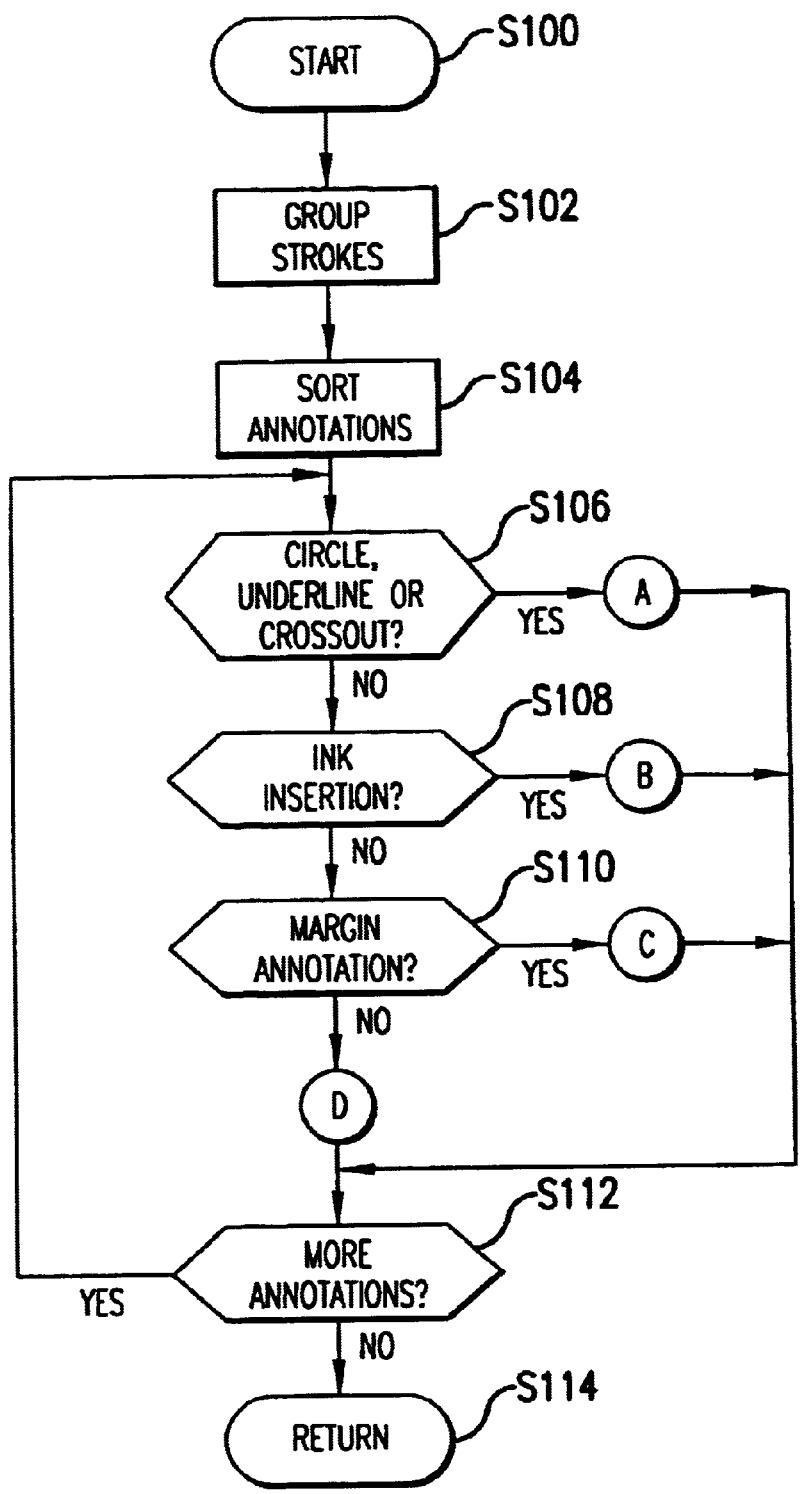
FIGS. 4A–4F show a flowchart outlining a control routine for mapping freeform digital ink annotations to objects in a display in accordance with an embodiment of the prevent invention.
Figure 4B:
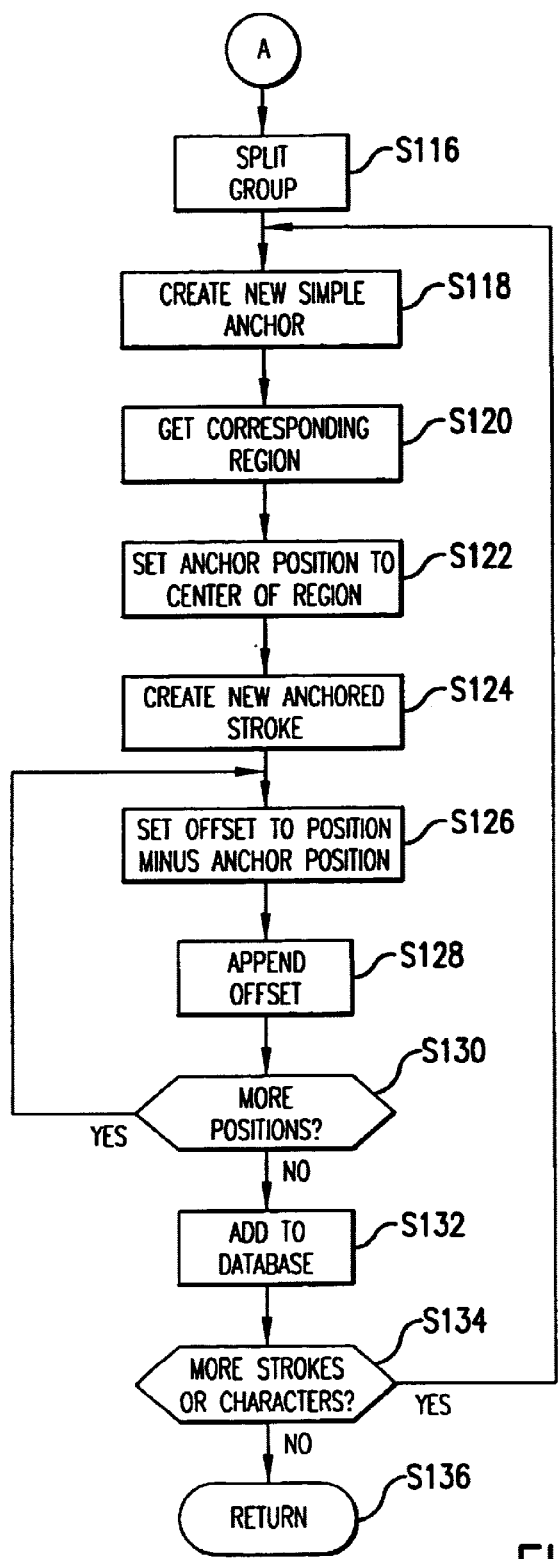
Figure 4C:
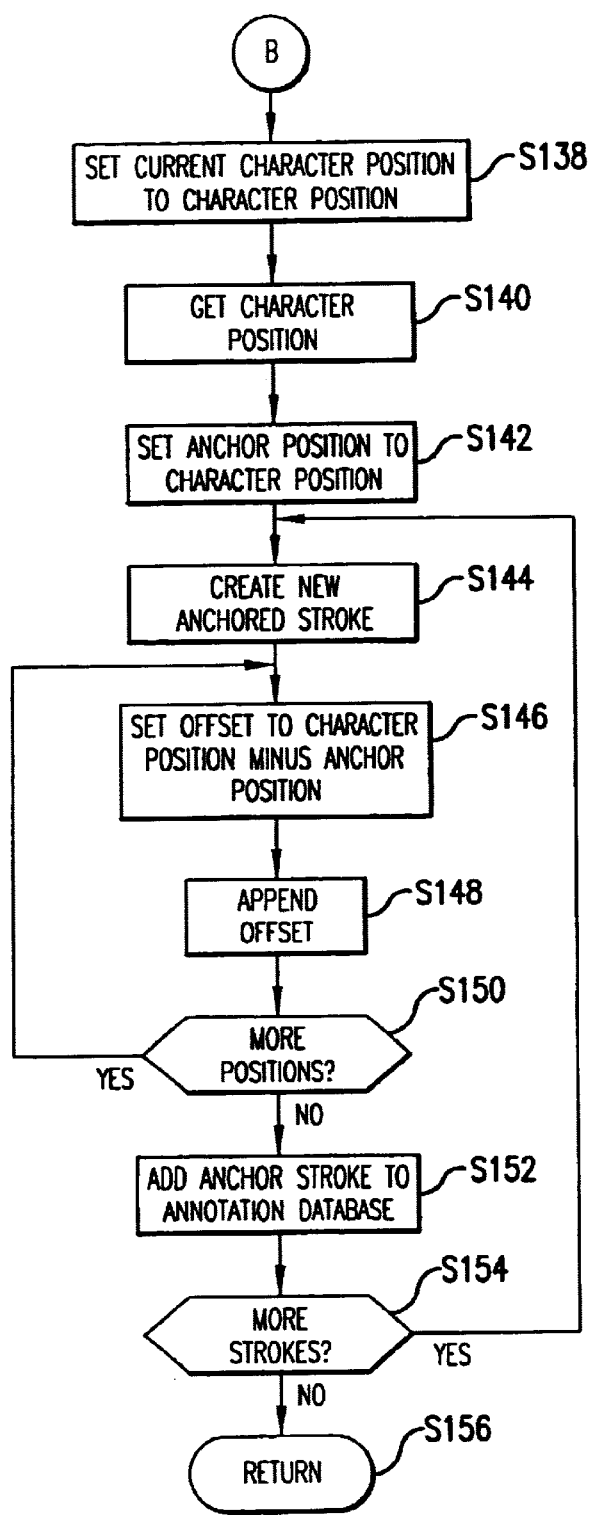
Figure 4D:
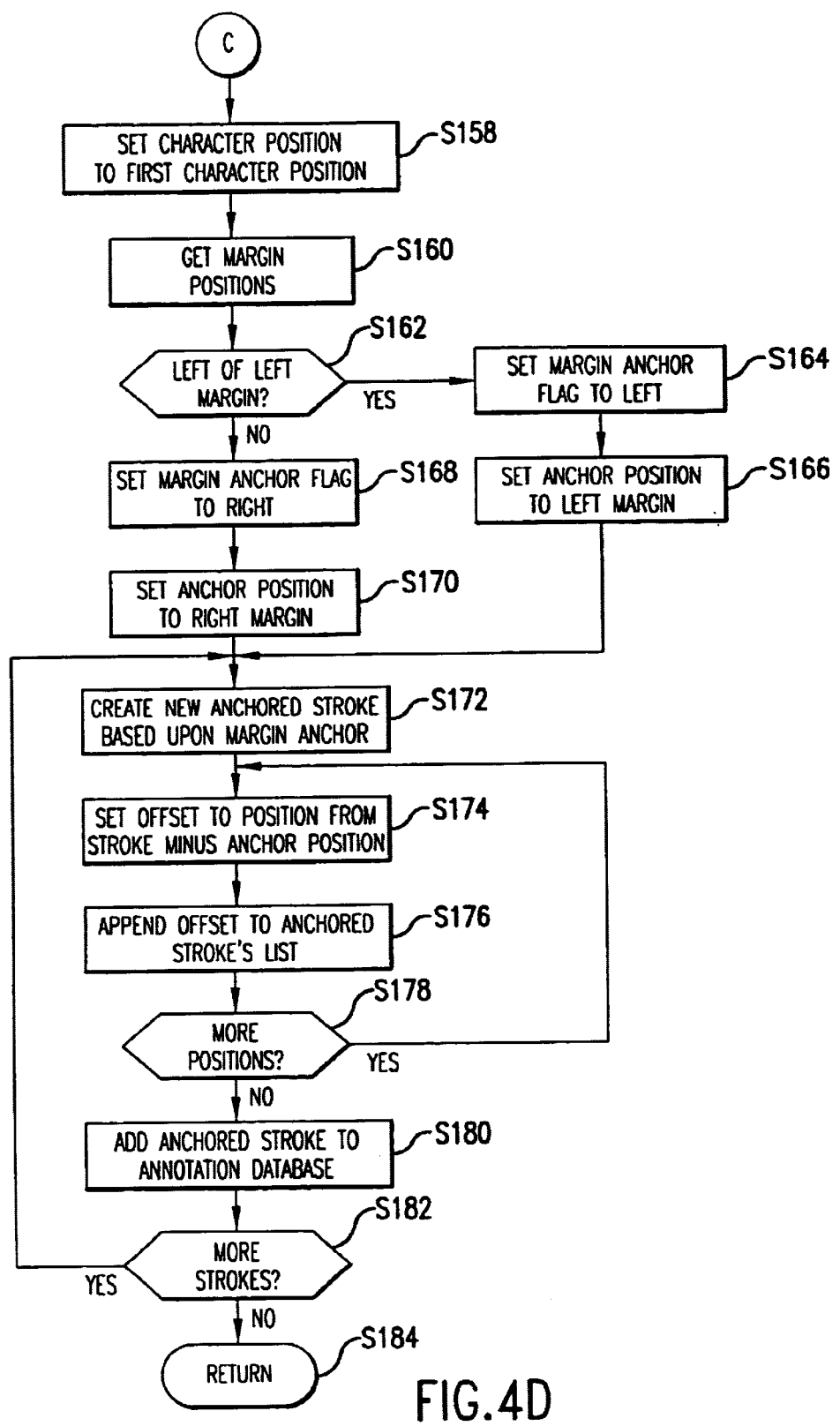
Figure 4E:
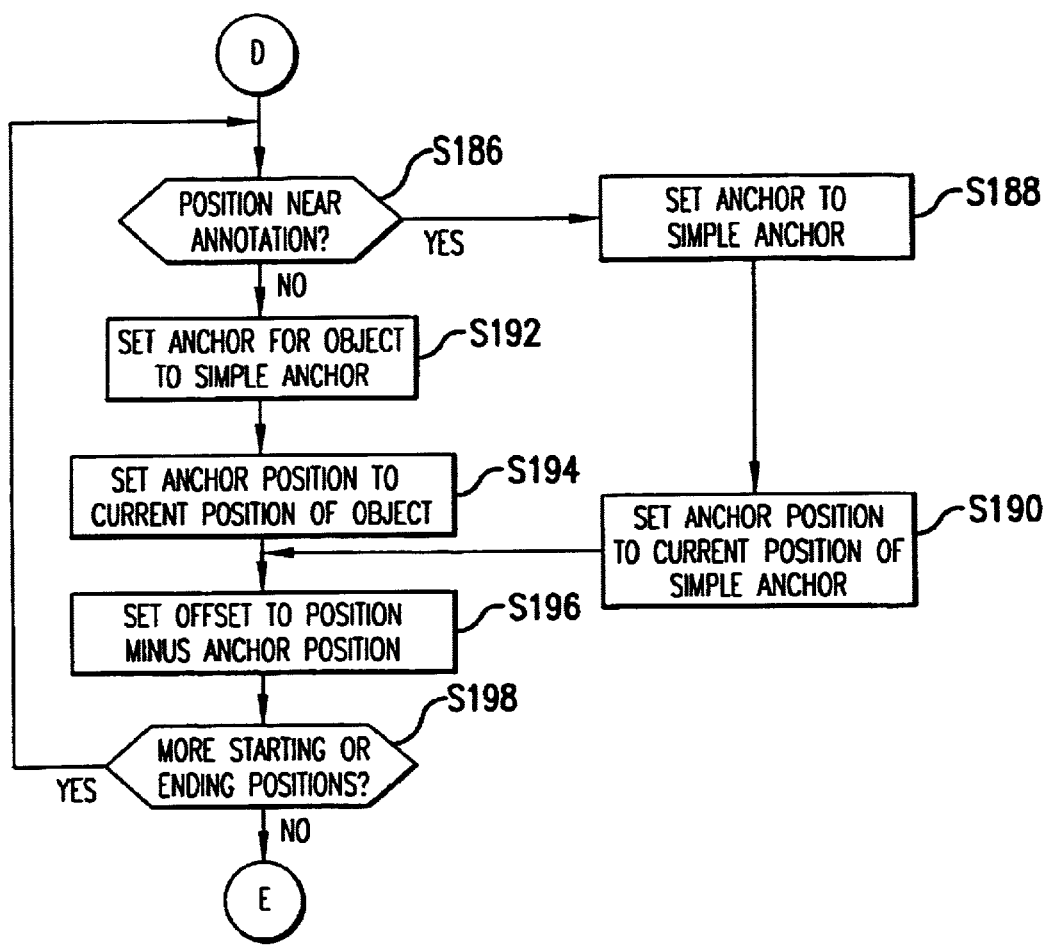
Figure 4F:
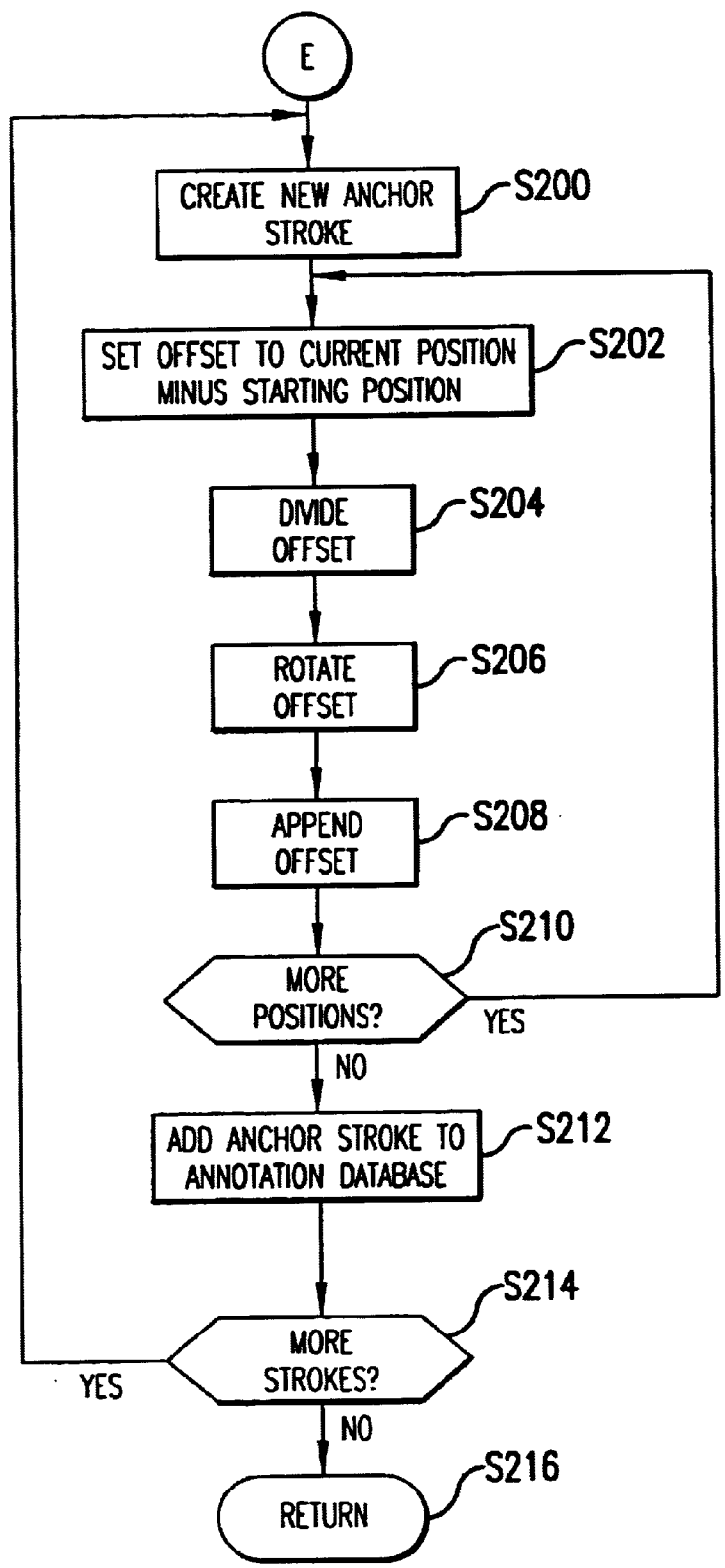

FIG. 3A shows a first view 50 of a document 52 having freeform digital ink annotations 54, 56 and 58. FIG. 3B shows a second view 60 of the document 52 after the document has been revised. FIG. 3B shows that the freeform digital ink annotations 54, 56 and 58 are adjusted in accordance with the logical relationships to the objects in the document 52 in accordance with an embodiment of the invention. The content of the document 52 shown in FIG. 3A has been edited to insert the text "is so much fun to do" at 62 and to delete approximately two full lines of text at 64. In response to these edits, the text that has been annotated at 54 now flows across two lines and the "cross-out" freeform digital ink annotation 54 flows along with the underlying text objects to continue to indicate the logical relationship between "cross-out" freeform digital ink annotation and the underlying text objects. The invention also recognizes that the group of ink strokes at 58 is a margin note and the system slightly adjusts the vertical position of the margin note 58 in the margin to continue to indicate the logical relationship between the margin note 58 and the reflowed line. Additionally, the freeform digital ink annotation 56 is adjusted to adapt to the one line being removed between the anchor points at 66 and 68 to continue to indicate its logical relationship to the text.

An embodiment of the method and system of the present invention involves at least a three-step process. The first step is adding the freeform digital ink annotation on objects in a first view. The second step involves mapping segments of the freeform digital ink annotations to corresponding objects in the view. The third step involves moving, scaling or otherwise transforming the freeform digital ink annotation to maintain the indication of the logical relationship between the freeform digital ink annotation and the corresponding objects as the display changes.

Optionally, in an embodiment of the invention the freeform digital ink annotations can be used as navigational markers. For example, the user can select an annotation in a view and return to the annotated view that existed when the annotation was created.

The freeform digital ink annotation of objects in changing views of an embodiment of the invention relies on an object model for the view. In the example of FIGS. 2A and 2B, the objects are the nodes in the hyperbolic browser. In the example of FIGS. 3A and 3B, the objects are the text characters. In a third example (not shown), the objects are the output from an object tracking system running on a video data stream.

An embodiment of the method and system of the invention maps the freeform digital ink annotations to objects in a view by placing anchors in the underlying document. For example, a simple circling, highlighting or a crossing out mark is anchored to the corresponding span of character positions that are covered by the freeform digital ink annotation in the view. In the example shown in FIGS. 3A and 3B, a comment 58 in the margin is anchored to a position in the document in the margin near all of the corresponding words or characters.

More complex freeform digital ink annotations may have several anchors. For example, as shown in FIGS. 3A and 3B, consider a freeform digital ink annotation 56 that includes a circle 68 connected to an arrow 66. The circle 68 is anchored to the span of words or characters that is selected by the circle and the tip of the arrow 66 is anchored to its end point while the line connecting the circle 68 and the tip of the arrow 66 is not anchored.

An even more complex freeform digital ink annotation may involve logical relationships to moving objects in a virtual world. An example of such an annotation involves the freeform digital ink annotation of a door to a room in a virtual world. The layout of the door changes in a view of the virtual world as the door is opened or closed. The method and system of an embodiment of the invention maintain the indication of the logical relationship between the freeform digital ink annotation and the door as the view of the door changes. Thus, the user sees the freeform digital ink annotation rotating with the door.

For the purposes of the following discussion, the following definitions are provided: A position is a two-dimensional coordinate in a view. A stroke is a list of positions in a view. An offset is a two-dimensional offset from a position in a view. A region is a portion of a two dimensional view that is represented, for example, by a bounding box or by a list of positions. A character is a character in a text document. Character positions between characters in the flow of text are maintained as the text changes. A margin anchor is a character position and a boolean flag for left or right margins. A simple anchor is a character, a character position or a margin anchor. A composite anchor is a pair of simple anchors with offsets. An anchor is either a simple anchor or a composite anchor. An anchored stroke is an anchor plus a list of offsets.

An embodiment of the method and system of the invention moves the anchor points if the underlying anchored objects move. Unanchored segments of the freeform digital ink will stretch to fit between the anchored points. Sometimes adjacent anchor points move apart because the underlying objects move apart: For example, if a text phrase reflows from a single line across two lines (as shown in FIGS. 3A and 3B). In such cases, the connection between the formerly adjacent anchored points can be left out to reduce clutter and any unanchored ink between those points can be removed. Thus, as shown in FIG. 3B, the reflowed freeform digital ink annotation is split and does not show ink extending between the two segments, which are on two separate text lines. If anchor objects for a stroke are deleted, then the freeform digital ink annotations can be remapped to the nearest remaining objects in the document. If all anchor objects for the freeform digital ink annotation are deleted then the annotation can be deleted.

The type of the anchors for the freeform digital ink annotation depends upon the shape of the annotation and the kind and number of the corresponding objects. One method, detailed below, for computing ink anchors is to select the nearest object for each segment in the ink. Alternatively, the type of stroke, as determined from its shape, can be used to determine the anchor objects. In another case, a freeform digital ink annotation with multiple anchors may cause unwanted distortions when the view changes. To avoid this problem, an embodiment of the present invention groups segments of the freeform digital ink annotation together to reduce the number of anchors.

As briefly described earlier, an embodiment of the method and system of the present invention uses at least three processes. The first process receives freeform digital ink annotations on the view, the second process computes a logical mapping between objects in the view and the freeform digital ink annotations, and the third process renders the freeform digital ink annotations on a view that has changed. An optional fourth process selects freeform digital ink annotations to navigate to a previous state.

The first process includes sensing data points from a pointing device, such as a mouse or a pen, rendering the ink strokes by connecting the points on the view, and grouping the ink strokes together to form a freeform digital ink annotation. These ink strokes may be grouped, for example, by a simple time threshold. The second process receives the freeform digital ink annotations as input and maps between the objects and the freeform digital ink annotations. The third process updates the view when the document changes. This process uses the mapping to render the freeform digital ink annotation on the objects as the view changes.

The procedures and the embodiments of the invention described herein assume that the objects do not change while the user is inking. However, the method and system of the invention is not limited to applications in which the objects being annotated do not change. As an example, in the case of video, the video may be halted while the user marks. Alternatively, the video can continue while the user marks and the state of the objects at some point in time can be used to interpret the objects and update the mapping between the objects and the freeform digital ink annotations.

The fourth process takes a selection on a view, determines if it corresponds to a freeform digital ink annotation, and, if it does, replaces the current view with the view which existed when the freeform digital ink annotation was made. This process requires storing an additional mapping from the freeform digital ink annotations to the state of the changing view.

The present invention recognizes that objects may be built from sub-objects which may be split from each other. One example is a text phrase that is built out of words. If a phrase has a freeform digital ink annotation that circles the phrase and if that phrase reflows across two lines, the invention recognizes this split and may either reflow the freeform digital ink annotation by splitting it up into several segments, each of which follows the corresponding underlying words as they move, or the system may choose to draw lines between matching segments of the circle. Alternatively, the freeform digital ink annotation could be replicated at a smaller scale on each individual word.

A user can also copy a phrase to another paragraph, which could be considered a form of splitting or as an entirely new and unrelated object, without the circle annotation.

Conversely, objects can merge into larger entries. For example, if an unannotated word between two annotated words is deleted then the two annotated words "merge" to form an annotated phrase. The two annotations join to form a single annotation of the merged phrase.

Objects may also disappear entirely. For example, words in a text editor can be deleted. In this case, the freeform digital ink annotations associated with the object can disappear also, or they can remain at the location between the surrounding objects.

Objects can also change. For example, a user in a text editor can select an annotated word and replace it with a new word. The new word could be considered a new version of the original object. The annotation on the original word may then be associated with the new object. In this case, the annotation may alter its shape to conform to the new word, for example, by stretching or shrinking. Alternatively, the annotation could be removed from the display.

An embodiment of the method and system of this invention may group ink strokes on text to form a single freeform digital ink annotation. By way of non-limiting examples, the annotations can be categorized as circles, underlines/cross-outs, insertions, margin notes, and connectors. Annotations that are circles are identified by ink stroke circles that contain text and these ink stroke circles are mapped to the text objects inside the ink stroke circle. Underline/cross-out annotations are identified by elongated marks which are either directly on the text or underneath the text. These annotations are mapped to the text objects that they are on or underneath. An annotation may be identified as an insertion if the annotations dips into a line of text. An insertion annotation maps to the position where the insertion mark appears in the text, for example, between two characters. A margin note is an annotation which is located in a margin. The margin note annotations are mapped to the text that is adjacent to the vertical and/or horizontal position of the annotations. Connector annotations are identified as connectors by arrows that may appear at the end of the annotation or by lassos (i.e., a circle plus a line and a single stroke). A connector annotation is split into a circle and a connector portion. Connector annotations are mapped to two objects independently. The first object is the object that occurs at the start of an annotation and the second object occurs near the end of the annotation. These objects may be positions in the text, or they may be other annotations. As an example, one end of the line portion of a lasso is mapped to the circle annotation which, in turn, maps to the text. Another example is a line from the text to a margin annotation. One end of the line is mapped to the text while the other end is mapped to the margin annotation.

FIG. 6 shows several exemplary types of freeform digital ink annotations. FIG. 6 shows a display of a document 400 including circle (or enclosure) annotations 402 and 404, an underline annotation 406, cross-out annotations 408 and 410, insertion annotations 412 and 414, a margin annotation 416, a line to margin annotation 418 (with associated margin note 420) and an arrow connector 422. It should be understood that the types of freeform digital ink annotations shown in conjunction with the descriptions of various exemplary embodiments herein are intended to be illustrative and not limiting to any particular embodiment/type or grammar of annotation.

The method and system of this invention is based upon the concept that anchors are determined for freeform digital ink annotations. Anchors are offsets from objects. Freeform digital ink annotations are mapped to the object structure of the view underlying the freeform digital ink annotations. While it is to be understood that the mapping may be to hierarchical object structures such as characters, phrases and paragraphs, for the sake of simplicity, the following description describes a mapping of a single level: between freeform digital ink annotations and characters or positions between characters. A text editor maintains these characters and positions as the text changes. For characters that have been deleted, the text editor marks the characters and their corresponding character positions as deleted, but the text editor still maintains a correspondence between the character positions and some location between remaining characters.

An embodiment of the method and system of the invention may rely upon a text editor that stores the sequence and presentation of characters. The embodiment can determine if a character position, a character or a range of characters has been deleted; can acquire the position in the view that corresponds to a character position; acquire the region in the view that corresponds to a character; can obtain left and right margin positions that correspond to a character position; can acquire a range of character positions that correspond to a region in a view; and can split a freeform digital ink annotation into a set of substrokes or segments, such that each substroke corresponds to a single character or to a position between characters.

One embodiment of the method and system of the invention may also use an annotation database that stores anchored strokes. The annotation database may be accessed to add an anchored stroke to the database, to delete an anchored stroke from the database or to acquire a list of all of the anchored strokes.

FIGS. 4A through 4F show a flow chart outlining a control routine for mapping freeform digital ink annotations to objects in an underlying view in accordance with an embodiment of the invention. The flow chart parallels the following pseudocode.

```
First, classify the group of strokes as circles, underlines/cross-outs,
insertions, margin notes, or connectors. Notice that this may require
splitting some of the strokes, and may result in several groups
of strokes. Then, Sort the new groups of strokes so that connectors
appear after any groups they connect to
For each new group of Strokes
    If the group is a circle or an underline or a cross-out, then
        Split the group of strokes into a list of strokes
        and characters
        For each stroke and character pair in the list
            Create a new simple anchor corresponding
            to the character
            Get the region corresponding to the character
            Let anchor position be the center of the region
            Create a new anchored stroke based on the simple anchor
            For each position in the stroke,
                Let offset be position minus anchor position
                Append offset to the anchored stroke's list of offsets
            End for
            Add anchored stroke to the annotation database
        End for
    Else if the group is an ink insertion into the text, then
        Let character position be the character position
        where the ink dips into the text
        Get the position corresponding to the character position
        Let anchor position be that position
        For each stroke in the group
            Create a new anchored stroke based on the character
            position
            For each position in the stroke
                Let offset be position minus anchor position
                Append offset to the anchored stroke's list of offsets
            End for
            Add anchored stroke to the annotation database
        End for
    Else if the group is a margin annotation, then
        Let character position be the first character
        position corresponding to the vertical extent
        of the annotation
        Get the left and right margin positions
        corresponding to character position
        If the group is mostly to the left of the
        left margin position, then
            Let margin anchor be
            { character position, flag=left }
            Let anchor position be the left margin position
        Else
            Let margin anchor be
            { character position, flag=right }
            Let anchor position be the right margin position
        End if
        For each stroke in the group,
            Create a new anchored stroke based on the margin anchor
            For each position in the stroke
                Let offset be position minus anchor position
                Append offset to the anchored stroke's list of offsets
            End for
            Add anchored stroke to the annotation database
        End for
    Else if the group is a connector, then
        For each of starting and ending position on connector
            If position is near an annotation
                Let simple anchor be the anchor for that annotation
                Let anchor position be the current position of the
                simple anchor
                Let offset be position minus anchor position
            Else (position is near an object)
                Let simple anchor be the anchor for that object
                Let anchor position be the current position of the
                object
                Let offset be position minus anchor position
            End if
        End for
        Let composite anchor be the anchors and offsets
        corresponding to the starting and ending positions
        For each stroke in the group
            Create a new anchored stroke based on
            the composite anchor
            For each position in the stroke
```

-continued

```
                Let offset be position minus starting position
                Divide offset by the distance between thestarting
                and ending positions
                Rotate offset around the origin by-angle (ending
                position minus starting position)
                Append offset to the anchored stroke's list of offsets
            End for
            Add anchored stroke to the annotation database
        End for
    End if
End for
```

The control routine shown in FIGS. 4A–4F starts at step S100 and continues to step S102. In step S102, the control routine groups the ink strokes into annotations such as circles, underlines/cross-outs, insertions, marginalia or connectors. It is to be appreciated that this may require splitting some strokes and may result in several groups of strokes. The control routine then continues to step S104 where the annotations are sorted so that connectors appear after any group to which they are connected. The control routine then continues to step S106 where the control routine initiates a loop that iteratively processes all of these annotations. The control routine determines if the current annotation is a circle, an underline or a cross-out. If in step S106, the control routine determines that the current annotation is a circle, an underline or a cross-out then the control routine jumps to step S116. If, on the other hand, in step S106 the control routine determines that the current annotation does not include a circle, an underline or a cross-out then the control routine continues to step S108. In step S108, the control routine determines if the current annotation is an ink insertion. If, in step S108, the control routine determines that the current annotation is an ink insertion then the control routine jumps to step S138. If, on the other hand, the control routine determines that the current annotation is not an ink insertion, then the control routine continues to step S110. In step S110, the control routine determines if the if the current annotation is a margin annotation. If, in step S110, the control routine determines that the current annotation is a margin annotation then the control routine jumps to step S158. If, on the other hand, in step S11O, the control routine determines that the current annotation is not a margin annotation then the control routine jumps to step S186.

After completing one of the processes of FIGS. 4B–4F, which will be explained in detail below, the control routine continues to step S112 where the control routine determines if more annotations need to be processed. If in step S112, the control routine determines that more annotations need to be processed, then the control routine returns to step S106. If, on the other hand, the control routine determines that no more annotations need to be processed, then the control routine continues to step S114 where control is returned to the environment in which the control routine of FIGS. 4A–4F operate.

At step S116, the control routine splits the annotation into a list of substrokes each with a corresponding single character. Thus, the control routine splits the annotation into substroke/character pairs. The control routine then continues to step S118, where the control routine initiates a loop to iteratively process each substroke/character pair in the current annotation. In step S118, the control routine creates a new simple anchor that corresponds to the current character. The control routine then continues to step S120 where the control routine acquires the region in the view that corresponds to the current character. The control routine then continues to step S122 where the control routine sets an anchor position to the center of the region in the view. The control routine then continues to step S124 where the control routine creates a new anchored stroke that is based upon the simple anchor and continues to step S126. In step S126, the control routine sets an offset to the position from the substroke minus the anchor position and continues to step S128. In step S128, the control routine appends the offset to the anchored stroke's list of offsets and continues to step S130. In step S130, the control routine determines whether more positions exists in the current substroke. If the control routine determines in step S130 that more positions exists in the current substroke, then the control routine returns to step S126. If, on the other hand, the control routine determines that more positions do not exist in the current substroke then the control routine continues to step S132. In step S132, the control routine adds the anchored stroke to the annotation database, and the control routine then continues to step S134. In step S134, the control routine determines if more substroke/character pairs exist in the current annotation. If, in step S134, the control routine determines that more substroke/character pairs exist in the current annotation then the control routine returns to step S118. If, on the other hand, the control routine determines, in step S134, that no more substroke/character pairs exist in the current annotation then the control routine continues to step S136 where control returns to step S112.

At step S138 the control routine sets a current character position to the character position where the annotation dips into the text. The control routine then continues to step S140 where the control routine acquires the position corresponding to the current character position. The control routine then continues to step S142 where an anchor position is set to the current character position. The control routine then continues to step S144 where the control routine initiates a loop to process all strokes in the annotation. In step S144, the control routine creates a new anchored stroke based upon the current character position as an anchor and the control routine continues to step S146. In step S146, the control routine sets an offset to the current character position from the stroke minus the anchor position and continues to step S148. In step S148, the control routine appends the offset to the anchored stroke's list of offsets and continues to step S150. In step S150, the control routine determines whether more positions exists in the current stroke. If, in step S150, the control routine determines that more positions exist in the current stroke then the control routine returns to step S146. If, on the other hand, in step S150, the control routine determines that no more positions exist in the current stroke then the control routine continues to step S152. In step S152, the control routine adds the anchored stroke to the annotation database and the control routine continues to step S154. In step S154, the control routine determines whether more strokes exist in the current annotation. If, in step S154, the control routine determines that more strokes exist in the current annotation then the control routine returns to step S144. If, on the other hand, the control routine determines, in step S154, that no more strokes exists in the current annotation then the control routine continues to step S112.

At step S158, the control routine sets a character position to the first character position corresponding to the vertical extent of the current annotation. The control routine then continues to step S160 where the text editor acquires the left and right margin positions that correspond to the character position and continues to step S162. In step S162, the control routine determines whether the annotation is mostly to the left of the left margin. If, in step S162, the control routine determines that the annotation is mostly to the left of the left margin, then the control routine continues to step S164. If, on the other hand, the control routine determines that the annotation is not mostly left of the left margin then the control routine jumps to step S168. In step S164, the control routine sets the margin anchor to LEFT and the control routine continues to step S166. In step S166, the control routine sets an anchor position to the left margin position and continues to step S172.

In step S168, the control routine sets a margin anchor to RIGHT and continues to step S170. In step S170, the control routine sets an anchor position to the right margin position and continues to step S172. In step S172, the control routine initiates a loop to process all strokes in the current annotation. In step S172, the control routine creates a new anchored stroke based upon the margin anchor and continues to step S174. In step S174, the control routine sets an offset to the position from the current stroke minus the anchor position and continues to step S176. In step S176, the control routine appends the offset to the anchored stroke's list of offsets and continues to step S178. In step S178, the control routine determines whether more positions exist in the current stroke. If, in step S178, the control routine determines that more positions exist in the current stroke then the control routine returns to steps S174. If, on the other hand, in step S178, the control routine determines that no more positions exists in the current stroke then the control routine continues to steps S180. In step S180, the control routine adds the anchored stroke to the annotation database and continues to step S182. In step S182, the control routine determines whether more strokes exists in the current annotation. If, in step S182, the control routine determines that more strokes exists in the current annotation, then the control routine returns to step S172. If, on the other hand, the control routine determines, in step S182, that no more strokes exists in the current annotation then the control routine continues to step S156 where the control routine returns to step S112.

At step S186, the control routine initiates a loop to process all starting or ending positions in the current annotation. In step S186, the control routine determines whether the current of the starting and ending positions are near another annotation or an object. If in step S186, the control routine determines that the current position is near another annotation then the controller continues to step S188. If on the other hand, the control routine determines, in step S186, that the position is not near another annotation then the control routine continues to step S192. In step S188, the control routine sets a simple anchor as the anchor for the current annotation and continues to step S190. In step S190, the control routine sets an anchor position as the current position of the simple anchor and continues to step S196. In step S192, the control routine lets a simple anchor be the anchor for an object which is near the current starting or ending position and the control routine continues to step S194. In step S194, the control routine sets an anchor position to the current position of the object and the control routine continues to step S196. In step S196, the control routine sets an offset to the current position minus the anchor position and continues to step S198. In step S198, the control routine determines whether more starting or ending positions exist in the current annotation. If, in step S198, the control routine determines that more starting or ending positions exist in the current annotation then the control routine returns to step S186. If, on the other hand, the control routine determines, in step S198, that no more starting or ending positions exist in the current annotation then the control routine continues to step S200.

In step S200, the control routine initiates a loop to process all strokes in the current annotation. In step S200, the control routine creates an anchored stroke having a composite anchor based upon the anchors corresponding to the starting and ending positions and continues to step S202. In step S202, the control routine sets an offset to the current position in the current stroke minus the starting position and continues to step S204. In step S204, the control routine divides the offset by the distance between the starting and ending positions and continues to step S206. In step S206, the control routine rotates the offset around an origin by an angle equal to the ending position minus the starting position and continues to step S208. In step S208, the control routine appends the offset to the anchored stroke's list of offsets and continues to step S210. In step S210, the control routine determines whether more positions exists in the current stroke. If, in step S210, the control routine determines that more positions exists in the current stroke then the control routine returns to step S202. If, on the other hand, the control routine determines, in step S210, that no more positions exists in the current stroke then the control routine continues to step S212. In step S212, the control routine adds the composite anchor to the annotation database and continues to step S214. In step S214, the control routine determines if more strokes exists in the current annotation. If, in step S214, the control routine determines that more strokes exists in the current annotation then the control routine returns to step S200. If, on the other hand, the control routine determines that no more strokes exists in the current annotation, then the control routine continues to step S216 where the control routine returns to step S112.

Figure 5A:
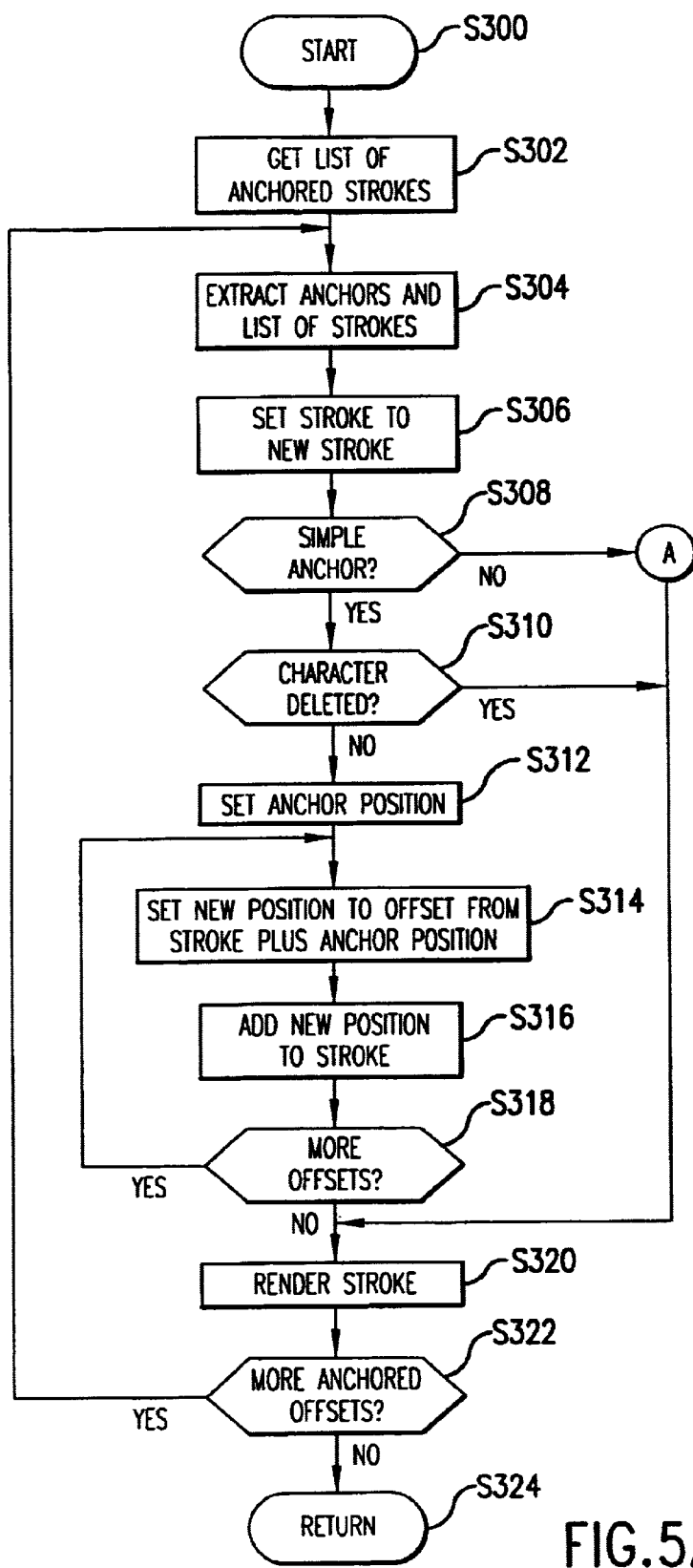
FIGS. 5A–5B show a flowchart outlining a control routine for rendering freeform digital ink annotations on a changed view in accordance with an embodiment of the present invention.
Figure 5B:
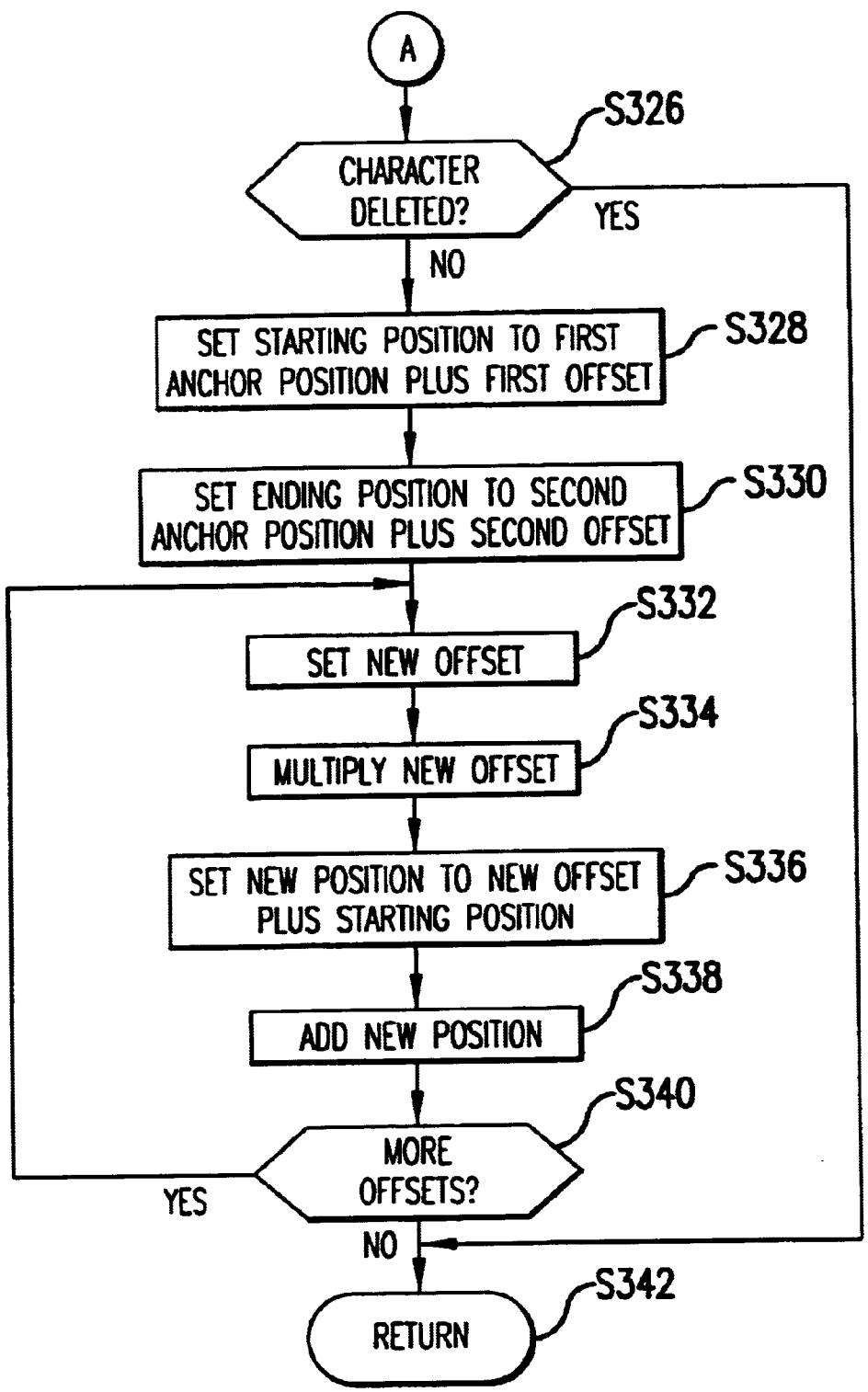

FIGS. 5A–5B shows a control routine for rendering freeform digital ink annotations on a changed view. The flow chart parallels the following pseudocode.

```
Using the annotation database, get the list of all anchored strokes
For each anchored stroke,
    Extract the anchor and the list of offsets
    Let stroke be a new stroke
    If anchor is a simple anchor
        Determine if the character or character position underlying the
    anchor has been deleted
        If not, then
            Let anchor position be the position of that anchor
            For each offset,
                Let new position be offset + anchor position
                Add new position to the stroke
            End for
        End if
    Else
        Determine if the character or character positions underlying the
        1st and 2nd anchors has been deleted
        If both have been deleted, then
            do nothing
        Else
            Let starting position be the position of the 1st anchor,
            plus the 1st offset
            Let ending position be the position of the 2nd anchor,
            plus the 2nd offset
            For each offset,
                Let new offset be offset rotated byangle (ending
                position minus starting position)
                Multiply new offset by the distance between the
                starting and ending positions
                Let new position be new offset plus starting
                position
                Add new position to the stroke
            End for
        End if
    End if
    Render stroke on the view
```

End for

The control routine starts at step S300 and continues to step S302. In step S302, the control routine acquires a list of all anchored strokes from the annotation database and continues to step S304. In step S304, the control routine extracts the anchors and the list of offsets from the current anchored stroke and continues to step S306. In step S306, the control routine lets the stroke be a new stroke and continues to step S308. In step S308, the control routine determines whether the anchor is a simple anchor. If, in step S308, the control routine determines that the anchor is a simple anchor then the control routine continues to step S310. If, on the other hand, the control routine determines, in step S308, that the anchor is not a simple anchor then the control routine jumps to step S326. In step S310, the control routine determines if the character or character position has been deleted. If, in step S310, the control routine determines that the character or character position has been deleted then the control routine jumps to step S320. If, on the other hand, the control routine determines that the character or the character position has not been deleted then the control routine then continues to step S312. In step S312, the control routine sets the anchor position to the position of that anchor for the offset and continues to step S314. In step S314, the control routine lets the new position be the offset from the stroke plus the anchor position and continues to step S316. In step S316, the control routine adds the new position to the stroke and continues to step S318. In step S318, the control routine determines whether there are more offsets for the anchor. If, in step S318, the control routine determines that there are more offsets then the control routine returns to step S314. If, on the other hand, the control routine determines that there are no more offsets then the control routine jumps to step S320. In step S320, the control routine renders the stroke on the view and continues to step S322. In step S322, the control routine determines if there are more anchored strokes in the annotation database. If, in step S322, the control routine determines that there are more anchored strokes in the annotation database then the control routine returns to step S304. If, on the other hand, the control routine, determines in step S322, that there are no more anchored strokes in the annotation database then the control routine continues to step S324 where the control routine returns control to the environment in which the control routine operates.

In step S326, the control routine determines if the character or character position underlying the first and second anchors been deleted. If, in step S326, the control routine determines that both of these character or character positions have been deleted then the control routine returns to step S320. If, on the other hand, the control routine determines, in step S326, that the character or character position underlining the first and second anchors have not been deleted then the control routine continues to step S328. In step S328, the control routine sets the starting position to the position of the first anchor plus the first offset and continues to step S330. In step S330, the control routine sets the ending position to the position of the second anchor plus the second offset and continues to step S332. In step S332, the control routine sets the new offset to the offset from the anchored stroke rotated by an angle equal to ending position minus starting position and the control routine continues to step S334. In step S334, the control routine multiplies the new offset by the distance between the starting and ending positions and continues to step S336. In step S336, the control routine sets the new position to the new offset plus the starting position and continues to step S338. In step S338, the control routine adds the new position to the stroke and continues to step S340. In step S340, the control routine determines whether more offsets exist. If, in step S340, the control routine determines that more offsets exist then the control routine returns to step S332. If, on the other hand, the control routine determines, in step S340, that no more offsets exists then the control routine returns to step S320.

Freeform digital ink annotation is intended to mean a visible ink stroke of arbitrary shape made with a pen, a mouse or other pointing device that persists over time. A pen based input device is intended to include a pen tablet, a pen display, a pen display tablet, a pen computer and/or a touch screen. The systems and methods of this invention may infer some meaning from the shapes or the morphological characteristics of ink strokes but do not remove the ink stroke once they have been recognized.

While the detailed description refers generally to electronic systems, it is intended to be understood that the method and system of the present invention may be applied to any electronic book and document reader that displays changing views. Electronic book and document readers include any electronic handheld device that can be accessed with a pointing device such as a pen and that accepts freeform digital ink as input. Electronic book and document readers may also include other additional features without limitation.

It is intended to be understood that the term "text" is intended to include text, digital ink, audio, video or any other content of a document, including the document's structure. An object is intended to be any component of a display such as, by way of non-limiting example, a character, a word, a phrase, a sentence, a paragraph, a line, a section, a chapter, a portion of an image that is identifiable by a computer vision system in a single image or in a stream of images as in a video, etc.

It should be understood that a change in the structure of a document is intended to include inserting, deleting, copying and moving of objects or the like. It is also intended to be understood that a change in the layout structure of a document includes reflowing of objects, resizing of objects, rotation of objects, stretching of objects, distortion of objects, morphing of objects or the like.

While this invention has been described in conjunction with the specific embodiments outlined above, it is evident that many alternatives, modifications and variations are apparent to those skilled in the art. Accordingly, the preferred embodiments of the invention as set forth above are intended to be illustrated and not limiting. Various changes may be made without departing from the spirit and scope of the invention.

What is claimed is:

1. A method for maintaining an indication of a logical relationship of at least one freeform digital ink annotation to at least one object in a first view as a position of the at least one object in the first view changes, the indication including a layout relationship of the at least one freeform digital ink annotation to the at least one object, the method comprising:

automatically mapping the logical relationship of the at least one freeform digital ink annotation to the at least one object based upon the layout relationship of the at least one freeform digital ink annotation and the at least one object in the first view by splitting the at least one freeform digital ink annotation into a plurality of substrokes, each substroke corresponding to the portion of the annotation that is in proximity to an object, and creating an anchor for the at least one freeform digital annotation; and, rendering the at least one freeform digital ink annotation in response to the generation of the second view, the layout relationship of the at least one freeform digital ink annotation and the at least one object in the second view being rendered based upon the mapped logical relationship of the at least one freeform digital ink annotation to the at least one object in the first view.

2. The method of claim 1, the at least one object being in an electronic book and document reader.

3. The method of claim 1, the at least one object being in a word processor.

4. The method of claim 1, the second view being generated in response to a change in the structure of a document.

5. The method of claim 1, the second view being generated in response to a change in the layout of a document.

6. The method of claim 1, the step of mapping comprising creating an anchor for the at least one freeform digital ink annotation.

7. The method of claim 1, wherein mapping the logical relationship comprises:

splitting the at least one freeform digital ink annotation into a plurality of substrokes, each substroke corresponding to a portion of the annotation that is in proximity to the at least one object; and creating an anchor for each of the plurality of substrokes based upon the layout relationship of each of the plurality of substrokes to the at least one object in the first view.

8. The method of claim 7, further comprising generating connecting lines between substrokes.

9. The method of claim 7, further comprising:

rendering the at least one freeform digital ink annotation comprises rendering the at least one freeform digital ink annotation in response to a separation of the at least one object in the second view, splitting the at least one freeform digital ink annotation further comprises splitting the at least one freeform digital ink annotation into at least two freeform digital ink annotations, each freeform digital ink annotation corresponding to the at least one the object.

10. The method of claim 1, wherein the at least one object comprises at least two objects and wherein the second view is in response to a merging of the at least two objects.

11. The method of claim 1, wherein the second view is in response to a replacement of the at least one object with at least one new object.

12. The method of claim 1, the mapping depending upon the shape of the at least one freeform digital ink annotation and the proximity of the at least one freeform digital ink annotation to the object.

13. The method of claim 12, the at least one freeform digital ink annotation being one of an underline and a cross-out annotation.

14. The method of claim 12, the at least one freeform digital ink annotation being an insertion annotation.

15. The method of claim 12, the at least one freeform digital ink annotation being a connector annotation.

16. The method of claim 1, the mapping depending upon the location of the at least one freeform digital ink annotation in the view.

17. The method of claim 16, the location being in a margin of the first view.

18. The method of claim 1, further comprising displaying the first view in response to a selection of the at least one freeform digital ink annotation in the second view.

19. The method of claim 1, the at least one freeform digital ink annotation including at least two freeform digital ink annotations and the at least one object including at least two objects that each correspond to one of the at least two freeform digital ink annotations, the method further comprising merging the at least two freeform digital ink annotations into a single freeform digital ink annotation when the corresponding at least two objects merge.

20. A system for maintaining an indication of a logical relationship of at least one freeform digital ink annotation to at least one object in a view as a position of the at least one object in the view changes, the indication including a layout relationship of the at least one freeform digital ink annotation to the digital object, the system comprising:

a display that displays the layout relationship of the at least one freeform digital ink annotation to the at least one object;

a processor that maps the at least one freeform digital ink annotation to the at least one object based upon the layout relationship of the at least one freeform digital ink annotation to the at least one object in a first view, the display responsive to a change in the first view to generate a second view in which a position of the at least one object is changed in relation to another object and to render the at least one freeform digital ink annotation in the second view, the layout relationship of the at least one freeborn digital ink annotation and the at least one object in the second view based on the mapped logical relationship of the at least one freeform digital ink annotation to the at least one object in the first view; and a processor that automatically maps the logical relationship of the at least one freeform digital ink annotation to the at least one object based upon the layout relationship of the at least one freeform digital ink annotation and the at least one object in the first view and creates an anchor for the at least one freeform digital annotation.

21. The system of claim 20, the system being a word processor.

22. The system of claim 20, the system being an electronic book and document reader.

23. The system of claim 20, further comprising a housing that holds the display and the processor, the housing being of a size that is small enough so that the system is capable of being held by a hand.

24. The system of claim 23, further comprising a pointing device.

25. The system of claim 20, the change in the first view being a change in the structure of a document.

26. The system of claim 20, the change in the first view being a change in the layout of a document.

27. The system of claim 20, the processor mapping the at least one freeform digital ink annotation by creating an anchor for the at least one freeform digital ink annotation.

28. The system of claim 20, the processor mapping the at least one freeform digital ink by splitting the at least one freeform digital ink annotation into a plurality of substrokes, each substroke corresponding to the portion of the annotation that is in proximity to an object; and creating an anchor for each of the plurality of substrokes based upon the layout relationship of each of the plurality of substrokes to at least one object in the first view.

29. The system of claim 28, the processor also capable of generating connecting lines between substrokes.

30. The system of claim 28, wherein the second view is generated in response to a splitting of the at least one object into at least two objects and to a separation of the at least two objects and wherein the at least one freeform digital ink annotation is split into at least two freeform digital ink annotations each corresponding to at least one of the at least two objects.

31. The system of claim 20, wherein the second view is generated in response to a replacement of the at least one object with at least one new object.

32. The system of claim 20, wherein the at least one object comprises at least two objects and wherein the second view is in response to a merging of the at least two objects.

33. The system of claim 20, the processor mapping depending upon the shape of the at least one freeform digital ink annotation and the proximity of the at least one freeform digital ink annotation to the at least one object.

34. The system of claim 33, the at least one freeform digital ink annotation being one of an underline and a cross-out annotation.

35. The system of claim 33, the at least one freeform digital ink annotation being an insertion annotation.

36. The system of claim 33, the at least one freeform digital ink annotation being a connector annotation.

37. The system of claim 20, the processor mapping depending upon the location of the at least one freeform digital ink annotation in the view.

38. The system of claim 37, the location being in a margin of the first view.

39. The system of claim 20, the at least one freeform digital ink annotation including at least two freeform digital ink annotations and the at least one object including at least two objects that each correspond to one of the at least two freeform digital ink annotations, the processor being responsive to a merger of the at least two objects to merge the at least two freeform digital ink annotations into a single freeform digital ink annotation.

40. The system of claim 20, the display being further responsive to a selection of the at least one freeform digital ink annotation in the second view to display the first view.

41. A method for maintaining an indication of a logical relationship of at least one freeform digital ink annotation to at least one object in a first view as a position of the at least one object in the first view changes, the indication including a layout relationship of the at least one freeform digital ink annotation to the at least one object, and usable with a hyperbolic browser on a node of a tree in a hyperbolic browser when the user changes the display to bring another portion of the tree into focus, the method comprising:

automatically mapping the logical relationship of the at least one freeform digital ink annotation to the at least one object based upon the layout relationship of the at least one freeform digital ink annotation and the at least one object in the first view;

rendering the at least one freeform digital ink annotation in response to the generation of the second view, the layout relationship of the at least one freeform digital ink annotation and the at least one object in the second view being rendered based upon the mapped logical relationship of the at least one freeform digital ink annotation to the at least one object in the first view; and rotating and scaling the freeform digital ink notation along with the tree to continue to indicate the logical relationship of the freeform digital ink annotation to the node, the indication including a layout relationship of the at least one freeform digital ink annotation to the at least one node.

42. A system for maintaining an indication of a logical relationship of at least one freeform digital ink annotation on a node of a tree in a hyperbolic browser when the user changes the display to bring another portion of the tree into focus, including rotating and scaling the freeform digital ink notation along with the tree to continue to indicate the logical relationship of the freeform digital ink annotation to the node, the indication including a layout relationship of the at least one freeform digital ink annotation to the at least one node, and usable with a hyperbolic browser on a node of a tree in a hyperbolic browser when the user changes the display to bring another portion of the tree into focus the system comprising:

a display that displays the layout relationship of the at least one freeform digital ink annotation to the at least one object; and a processor that maps the at least one freeform digital ink annotation to the at least one object based upon the layout relationship of the at least one freeform digital ink annotation to the at least one object in a first view, the display responsive to a change in the first view to generate a second view in which a position of the at least one object is changed in relation to another object and to render the at least one freeform digital ink annotation in the second view, the layout relationship of the at least one freeform digital ink annotation and the at least one object in the second view based on the mapped logical relationship of the at least one freeform digital ink annotation to the at least one object in the first view;

a processor that creates an anchor for each of the plurality of substrokes based upon the layout relationship of each of the plurality of substrokes to at least one object in the first view;

a processor for rotating and scaling the freeform digital ink notation along with the tree to continue to indicate the logical relationship of the freeform digital ink annotation to the node, the indication including a layout relationship of the at least one freeform digital ink annotation to the at least one node.

* * * * *